Oct. 27, 1970 J. P. JORDAN, JR., ET AL 3,536,904

FOUR-QUADRANT PULSE WIDTH MULTIPLIER

Filed Sept. 23, 1968

INVENTOR

J. PAUL JORDAN, JR.

ROBERT A. LEIGHTNER

BY

ATTORNEY

United States Patent Office 3,536,904 Patented Oct. 27, 1970

3,536,904

FOUR-QUADRANT PULSE WIDTH MULTIPLIER

J. Paul Jordan, Jr., and Robert A. Leightner, Burlington, Vt., assignors to General Electric Company, a corporation of New York Filed Sept. 23, 1968, Ser. No. 761,501
Int. Cl. G06g *7/16, 7/18*
U.S. Cl. 235—194 4 Claims

ABSTRACT OF THE DISCLOSURE

A signal representative of a first variable has its level compared with the level of a triangular waveform to produce a pulse whose width or duty cycle is proportional to the first variable's value. The pulse is used to switch the input of an integrator circuit between inverted and non-inverted signals representative of a second variable, whereby the integrator output is representative of a desired product of the first and second variables. A modification permits reduction of loading and frequency-sensitive errors by coupling to the integrator input a DC component of the integrator output and an inverted signal representative of the first variable.

BACKGROUND OF THE INVENTION

This invention relates to electronic multipliers for analog computing circuits, and more particularly to such multipliers using pulse width control to achieve four-quadrant operation.

Many diverse types of multipliers for two analog variables are known to the analog computation art. Perhaps the most widely accepted and used are those electronc multipliers embodying dual modulation techniques for a high-frequency sinusoidal or square waveform. The DC component of such a waveform is proportional to the desired product and can be extracted by suitable detection and averaging circuitry. The most common of these techniques is that known as time division, in which the square waveform is simultaneously amplitude modulated in proportion to the value of a first variable and pulse-width modulated in proportion to the value of a second variable. To obtain four-quadrant operation from these techniques, it is usually necessary to provide a number of subsystems operating in different quadrants, thus resulting in circuit complexity and multiplicity of components.

Another type of electronic multiplier previously known is that which controls the slope or duration of a linearized sawtooth waveform or the charge or discharge of a storage element, such as a capacitor, by means of an active element including a vacuum tube or a transistor device. While such multipliers generally provide four-quadrant operation with less circuit complexity than those utilizing dual modulation techniques, their accuracy depends heavily on the properties and characteristics of both the waveform generating circuitry and the active element.

Although circuits have been proposed which attempt to combine the techniques of waveform slope and duration control with those of dual modulation, such attempts have not significantly reduced the complexity nor increase the accuracy of electronic multiplers when applied to four-quadrant operation. Most important, these attempts have not permitted using standard circuit components, an advantage of modulation techniques, due to the aforementioned device and waveform limitations.

SUMMARY OF THE INVENTION

It is therefore an object of this invention to furnish an electronic multipler which, although nominally using a modulation technique, has overall circuit simplicity resulting from incorporation of waveform control techniques therein.

It is yet a further object of this invention to furnish such an electronic multiplier which, although using waveform control techniques, is not particularly dependent upon the properties or characteristics of waveform generation or control.

These objects and others, which will be realized from a consideration of the following specification, are achieved in one embodiment of the invention by using a triangular waveform to generate a series of pulses, each of whose duration is proportional to that of a first analog variable. The pulses simultaneously switch averaging circuitry between inverted and non-inverted signals representative of a second analog variable to obtain the desired product.

DESCRIPTION OF THE DRAWINGS

The subject matter of this invention is particularly pointed out and distinctly claimed in the concluding portion of the specification. The invention both as to organization and method of operation may best be understood by reference to the following description taken in conjunction with the accompanying drawings in which:

DESCRIPTION OF THE PREFERRED EMBODIMENT

Figure 1:
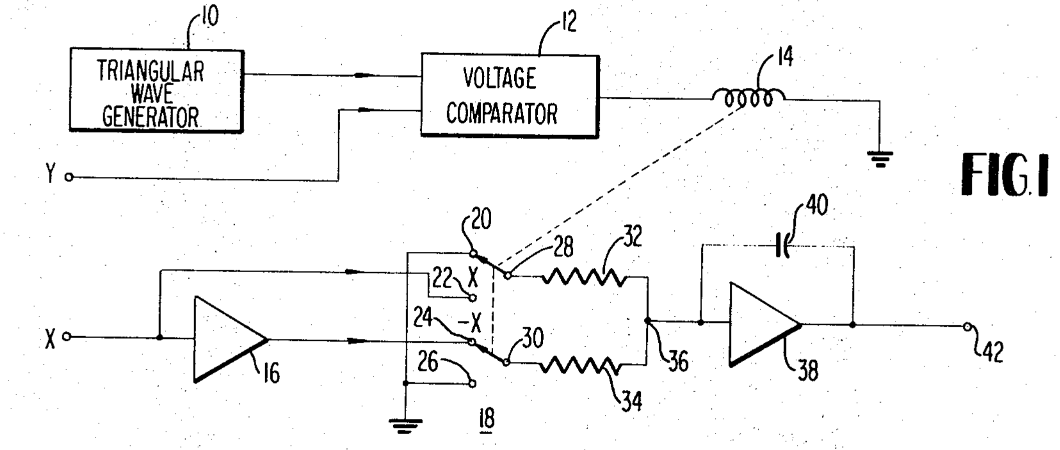
FIG. 1 is a schematic diagram of one embodiment of the invention.

Turning to FIG. 1, the wave shape or carrier which will be modulated in accordance with one of the input or computational variables is furnished by a triangular wave generator 10 whose output comprises a plurality of high-frequency, triangularly-shaped pulses which rise from and return to a reference level. Generator 10 may be one of many known to the art, the only requirement being that it produces a pulse which, together with the reference level base line, is a triangle, which may be an isosceles triangle, having its peak over the midpoint of the base line. Generators such as 10 are also known to the trade as pyramidal or serrisoid generators.

The triangular pulses from generator 10 are coupled to a first input of a voltage comparator 12 whose second input is provided by an analog signal or voltage whose value is directly proportional to a first input or computational variable Y. In essence, comparator 12 produces series of output pulses whose duration or duty cycle approaches 100% for positive values of the variable Y approaching the positive peak value of the triangular wave, approaches 0% for negative values of Y approaching the negative peak value of the triangular wave, and approaches 50% for values of Y equal to zero. Comparator 12 accomplishes this result by shifting its output level from a first state to a second state at a first point where the value of the signal Y equals the level of the triangular pulse; thereafter, the output level is maintained at the second state until the levels of the triangular pulse and the Y signal again coincide, at which time the output level reverts to the initial or first state.

With this description in mind, it is evident that voltage comparator 12 may be any well known gating circuit such as a differential amplifier, which is capable of providing an output state change in response to the relation of a rising and falling waveform to a fixed level. Alternatively, voltage comparator 12 could be simply embodied in a single transistor whose bias is fixed by the input signal Y and whose output is controlled in response to the level of the triangular pulse.

The pulses from comparator 12 are coupled to a switching means for a second input variable X. In the embodiment of FIG. 1, this circuitry includes a relay coil 14 coupled from comparator 12 to a source of reference potential.

An analog signal representing the second input variable X is coupled to the switching circuitry directly and by means of a logical inverter 16. The switching circuitry includes a contact arrangement 18 electro-mechanically coupled to relay coil 14 and comprises four stationary contacts 20, 22, 24, and 26. A source of reference potential is connected to contacts 20 and 26, a non-inverted signal representing the variable X to contact 22 and the inverted output of inverter 16 representing the variable —X to contact 24. Contact arrangement 18 also includes movable contacts 28 and 30 which are mechanically interconnected for simultaneous operation.

The signals present on movable contacts 28 and 30 are coupled to an input 36 of an integrator or averaging circuitry including an operational amplifier 38 and feedback capacitor 40 by means of resistors 32 and 34, respectively. An output point 42 of operational amplifier 38 has the desired product signal thereon.

Figure 2:
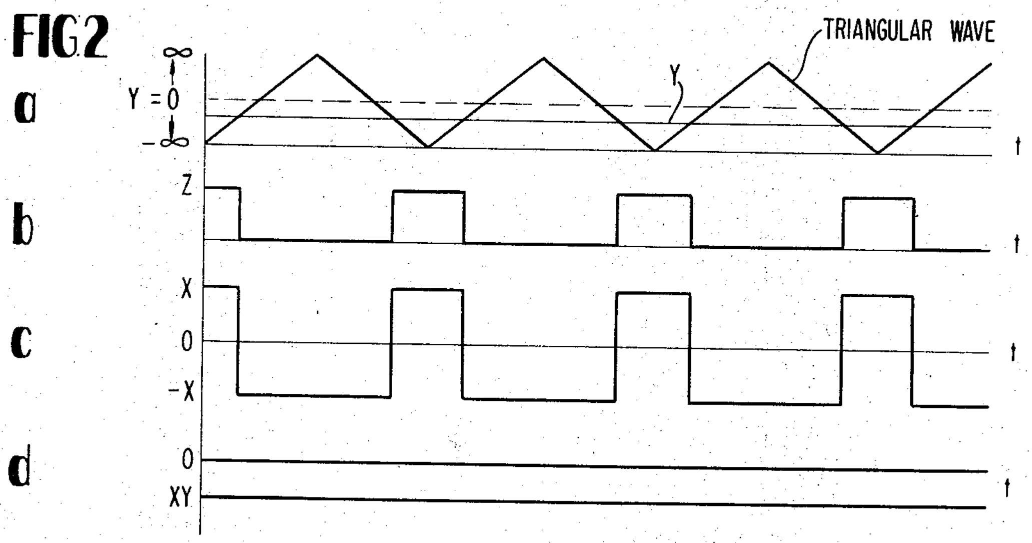
FIGS. 2*a*–2*d* are timing diagrams for use in explaining the operation of the circuitry in FIG. 1.

The operation of the switching circuitry, as well as that of the entire electronic multiplier, may best be visualized in terms of the timing diagram in FIG. 2. Both inputs to voltage comparator 12 are illustrated in FIG. 2(*a*). The triangular wave output from generator 10 is seen to vary at a given periodicity along a time axis, arising from and returning to a given reference level. During the time period illustrated, the value of the first variable Y has been chosen to be constant and is denoted by the solid straight line in FIG. 2(*a*). The dotted line therein passes through the triangular pulses at a point equal to one half of their individual heights and denotes the signal level at which the output pulses produced by the comparator 12 correspond to a value of the variable Y equaling zero. In like manner, the peaks of each pulse indicate the signal level at which the output corresponds to a value of Y approaching positive infinity, whereas the base line or reference level refers to values of Y approaching negative infinity. In practice, the triangular peaks have a finite value, denoted $Y_{max}$. In FIG. 2(*a*), Y has been chosen to possess a negative value.

The pulses produced by comparator 12 are seen in FIG. 2(*b*) and are formed by a precise change in state of the comparator output at the point where the triangular pulse and Y line intersect in FIG. 2(*a*), or where the value of the input variable Y signal equals the level of the triangular pulse. With the embodiment illustrated, the output state is at level Z for values of each triangular pulse less than that of the Y signal, and at reference level for values of the triangular pulse greater than that of the Y signal.

In FIG. 2(*c*), the composite signal supplied from contact arrangement 18 to point 36 comprises a square wave alternating with an overall periodically equal to that of the triangular wave from generator 10. It can be seen that the maximum amplitude of the waveform at point 36 varies between the signal levels corresponding to X inverted and non-inverted, or —X and X, and that the pulse width of the waveform, within the cyclical variation determined by generator 10, is determined by the width of the pulses from comparator 12.

More specifically, generation of the waveform in FIG. 2(*c*) is begun by energization of relay coil 14 upon attainment of output level Z from comparator 12. Upon energization, movable contact 28 connects the non-inverted input signal X present at contact 22 to point 36 through resistor 32 and movable contact 30 connects reference potential present at contact 26 thereto by means of resistor 34. When the output state of comparator 12 changes to reference level, relay coil 14 is de-energized and contact 28 now couples reference potential present at point 20 to point 36 and contact 30 couples the inverted input signal —X present at point 24 to point 36.

This process is repeated for every pulse produced from comparator 12. Averaging the waveform at point 36 over an appropriate length of time, the integrator including amplifier 38 and feedback capacitor 40 may produce an output signal at point 42 which is the average or DC component of the waveform and which corresponds directly to the desired product. Such a signal is illustrated in FIG. 2(*d*).

For varying values of the first input variable Y, the intersection point in FIG. 2(*a*) shifts so that width of the pulses at the output of comparator 12 accordingly and proportionally varies in response thereto. It is evident that when the Y signal equals zero the pulse width or duty cycle of the output of comparator 12 is 50%, that is, each pulse occupies one half of the total cyclical time determined by generator 10. In such a case, swinging between inverted and non-inverted signals of the second variable X produces a waveform at point 36 whose average or DC value is zero, directly corresponding to the desired product. Again, for values of Y greater than zero and approaching positive infinity, the pulse width increases so that the proportion in the waveform at point 36 of the non-inverted signal X to the inverted signal —X increases, thereby producing a positive average component representative of a positive product.

The circuitry in FIG. 1 performs four-quadrant multiplication, as sign inversion of the Y input varies the product sign in the manner just described. Sign inversion of the X input results in a 180° reversal of the waveform illustrated in FIG. 2(*c*) to produce a corresponding sign inversion in the product output. Most important, the circuitry of FIG. 1 will accomplish this four-quadrant multiplication with high accuracy and precision and by using circuit components which are readily available, such as the voltage comparator 12. In fact, since the functions of all the components in FIG. 1 are relatively simple, they can be implemented to a high degree of accuracy with few internal elements and a resultant lower cost. The most critical component is, of course, the triangular wave generator 10, but the art has long been proficient in accurately and precisely generating signal saw tooth waveforms, and the generation of an up-and-down saw tooth or a triangular wave poses no greater problems.

Figure 3:
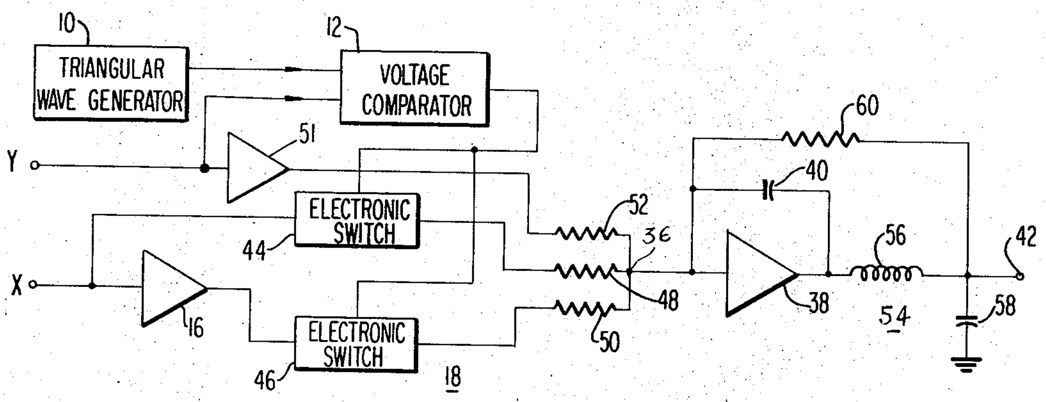
FIG. 3 is a schematic diagram of a modification of the invention illustrated in FIG. 1.

Although the embodiment in FIG. 1 is sufficient for most purposes, limitations upon its accuracy are provided by the use of an electro-mechanical device as the switching means. Accordingly, the embodiment of FIG. 3 is more suitable to high-accuracy analog computing applications and further illustrates a modification wherein any computational errors resulting from component variations may be significantly reduced. In FIG. 3, like devices to those of FIG. 1 are denoted by like numerals.

The relay 14 and contact arrangement 18 of FIG. 1 have been replaced by a pair of electronic switches 44 and 46. Electronic switch 44 couples the non-inverted X signal to input point 36 of amplifier 38 by means of a resistor 48; electronic switch 46 couples the inverted X signal to point 36 by means of a resistor 50. Both switches 44 and 46 are controlled by a connection from voltage comparator 12 upon which the aforementioned pulses are present.

In addition, to compensate for certain characteristics of switches 44 and 46 hereinafter to be described, the Y signal is inverted by logical inverter 51 and coupled to point 36 by a resistor 52.

Although electronic switches have transient switching capability far greater than that of any relay and contact arrangement, they lack truly bilateral characteristics. That is, most electronic switches tend to conduct better in one current direction than in an opposite direction. To achieve symmetry in operation and accurate computation, it is necessary to provide an electronic switch for both inverted and non-inverted signals representative of the X variable. Therefore, switch 44 is closed when a pulse of level Z is present at the output of comparator 12, thus coupling the non-inverted signal X to input point 36, and switch 46 is closed when the pulse of level Z vanishes from comparator 12, thus coupling the inverted signal —X to point 36.

Although the electronic multiplier so far described operates in a four-quadrant mode, the aforementioned non-bilateral characteristics of the electronic switches reduces its accuracy when the sign of the X signal is inverted. Electronic switch 44 can be designed to operate satisfactorily only for positive values of X and electronic switch 46 can be designed to operate satisfactorily only for negative values of X. To compensate for these non-bilateral characteristics, it has been found that inverting the signal representing the Y variable and applying it to input point 36 by means of a suitable scaling factor, determined by the value of the resistor 52 in relation to those of resistors 48 and 50, effectively restores the multiplier in FIG. 3 to accurate four-quadrant operation.

In more detail, one electronic switch couples the input 36 via a resistance 48 alternatively to a positive supply voltage $V_S$ and the non-inverted X signal; and another electronic switch couples the input 36 via a resistance 50 alternatively to a negative supply voltage $-V_s$ and the inverted X signal, at a duty cycle proportional to the value of the Y input signal. The major distinction between this waveform and that illustrated in FIG. 2(*c*) is that base line dependent on reference potential has been shifted to separate base lines of magnitude $V_s$ and $-V_s$ for the non-inverted and inverted X signals, respectively. In other words, the input 36 to the integrator has been biased by the magnitude of the supply voltage.

The scaling factor applied to the inverted Y signal necessary to compensate for this biasing and to return the circuit in FIG. 3 to accurate four-quadrant operation has been graphically determined to be a ratio of the supply voltage magnitude, $V_s$, divided by the maximum expected value of the Y input signal, $Y_{max}$. When the value of resistor 52 is accordingly chosen with respect to the $V_s/Y_{max}$ ratio, in accordance with 1 to 1 ratios for the values of resistors 48 and 50, proper four-quadrant operation occurs.

It can be shown by mathematical manipulations, based on a consideration of the inputs to the averaging circuitry in FIG. 3 that the desired product is produced. The area between the reference potential line and the output of electronic switch 44, having thereon the non-inverted, modulated X signal can be shown to be $$A_1 = Xt + (V_s - X)\left(\frac{Yt}{2Y_{max}} + \frac{t}{2}\right)$$

where the first term represents a DC portion proportional to the value of X throughout an interval and the second term represents an AC value of X, as modulated by the duty cycle of the output from voltage comparator 12.

Similarly, the output of electronic switch 46 can be written as $$A_2 = Xt + (X - V_s)\left(\frac{-Yt}{2Y_{max}} + \frac{t}{2}\right)$$

By time averaging the total area *a* of the input at point 36, $$A = A1 + A2 - \left(\frac{V_s}{Y_{max}}\right)Y$$

it can be shown that the output of the integrator is $$E_0 = \frac{XY}{Y_{max}}$$

FIG. 3 also includes modifications to compensate for frequency and loading errors in both the input and output of the integrator including operational amplifier 38. These modifications include a filter circuit 54 comprising an inductance 56 coupled from the output of amplifier 38 to output point 42, and a capacitor 58 coupled from output point 42 to source of reference potential; and a DC feedback resistor 60 coupled from output point 42 to input point 36. Filter circuit 54 further smooths the output from the integrator circuit; in turn, resistor 60 eliminates any loading effects by the ensuing circuitry coupled to output point 42 upon the filter circuit 54. Finally, it has been empirically found that the scaling factor $V_s/Y_{max}$ applied by resistor 52 may be chosen so as to substantially minimize frequency-dependent variations in the operation of the preceding circuit components in FIG. 3, such as switches 44 and 46 and comparator 12.

While this invention has been described with respect to a preferred embodiment and a modification thereof, it is to be clearly understood by those skilled in the art that the invention is not limited thereto. For example, inverter 51 and resistor 52 could easily be eliminated from the circuitry of FIG. 3 if only two-quadrant operation were desired. Alternatively, various configurations for generator 10, comparator 12, relay coil 14 and contact arrangement 18, or electronic switches 44 and 46, are envisaged. Accordingly, the invention is intended to be bounded only by the limits of the appended claims.

What is claimed is:

1. Apparatus for providing the product of a pair of input signals comprising:

a first input means for receiving a first signal ($V_y$) having a maximum voltage level ($V_{y\ max}$):

a second input means for receiving a second signal ($V_x$);

a generator for producing a cyclical series of triangular pulses and having an output terminal;

an output means having an output terminal and including three impedances, each having an input terminal and an output terminal, the respective output terminal of each of said impedances being coupled to said output terminal of said output means;

voltage level comparing means having first and second input terminals and an output signal terminal, the output signal being at a first voltage level when the voltage at said first terminal is above the voltage at said second terminal, and at a second level when the voltage at said first terminal is below the voltage at said second terminal;

a first electronic switch having an input terminal, a terminal for connection to a positive supply voltage ($V_s$), a control terminal and an output terminal;

a second electronic switch having an input terminal, a terminal for connection to a negative supply voltage ($-V_s$), a control terminal and an output terminal;

said first input terminal of said voltage comparing means being coupled to said output terminal of said triangular pulse generator, said second terminal of said voltage comparing means being coupled to said first input means, and said output terminal of said voltage comparing means being coupled to said control terminals of said first and second switches, whereby, when said voltage comparing means output signal is at said high level, said output terminal of said first switch is coupled to said input terminal of said first switch, and when said voltage comparing means output signal is at said low level, said output terminal of said first switch is coupled to said supply voltage terminal of said first switch, and when said voltage comparing means output signal is at said low level said output terminal of said second switch is coupled to said input terminal of said second switch, and when said voltage comparing means output signal is said high level, said output terminal of said second switch is coupled to said supply voltage terminal of said second switch;

a first inverter having an input terminal and an output terminal;

said input terminal of said first switch being coupled to said second input means, and said output terminal of said first switch being coupled to said input terminanl of said second impedance;

said input terminal of said first inverter being coupled to said second input means, said output terminal of said first inverter being coupled to said input terminal of said second switch, and said output terminal of said second switch being coupled to said input terminal of said third impedance;

a second inverter having an input terminal and an output terminal;

said input terminal of said second inverter being coupled to said first input means and said output terminal of said second inverter being coupled to said input terminal of said first impedance.

2. Apparatus according to claim 1 wherein:

said output means includes;

a time averaging circuit coupled between said input terminals of said three impedances and said output terminal of said output means, and the resistances of said first, selond and third impedanres are provided in the following ratio:

$$\frac{V_s}{V_{y\ max.}}:1:1$$

3. Apparatus according to claim 2 wherein:

said time averaging circuit includes;

an operational amplifier having an input terminal and an output terminal;

a filter circuit coupled between said amplifier output terminal and said output terminal of said output means;

alternating current feedback means coupled between said amplifier input and output terminals; and direct current feedback means coupled between said amplifier input terminal and said output terminal of said output means.

4. A process of multiplying in four quadrants a first signal ($V_y$) having a maximum voltage level ($V_{y\ max}$) by a second signal ($V_x$), comprising:

continuously comparing said first multiplier signal with a symmetrical triangular wave to generate a control signal of a first level when the first multiplier signal is higher than the triangular wave and or a second level when the first multiplier signal is lower than the triangular wave, alternatively passing said second multiplier signal through a first resistance to a summing point and a negative supply voltage through a second resistance to the summing point when the control signal is at the first level, and the inverse of said second multiplier signal through the second resistance to the summing point and a positive supply voltage through the first resistance when the control signal is at the second level, continuously passing the inverse of said first multiplier signal through a third resistance to the summing point, and time averaging the signal level at the summing point, said first, second and third resistances being chosen to have the following ratio:

$$\frac{V_s}{V_{y\ max.}}:1:1$$

References Cited

UNITED STATES PATENTS

| | | | |
|---|---|---|---|
| 2,952,408 | 9/1960 | Davis et al. | 235—194 |
| 2,995,305 | 8/1961 | Schmid | 235—194 |
| 3,217,151 | 11/1965 | Miller et al. | 235—194 |
| 3,309,510 | 3/1967 | Brown | 235—194 |
| 3,393,307 | 7/1968 | Courtenay et al. | 235—194 X |

MALCOLM A. MORRISON, Primary Examiner

J. F. RUGGIERO, Assistant Examiner

U.S. Cl. X.R.

235—183